United States Patent Office 2,805,253
Patented Sept. 3, 1957

---

2,805,253
PROCESS FOR THE PREPARATION OF CYCLOHEXANONE OXIME

Josef Heinrich Fritz Pieper, Berlin-Lichterfelde-West, and Johanna Elisabeth Viktoria Natalie Stauch, Berlin-Nikolassee, Germany, assignors, by mesne assignments, to Hercules Powder Company, Wilmington, Del., a corporation of Delaware No Drawing. Application April 14, 1955,
Serial No. 501,447

Claims priority, application Germany May 14, 1954

2 Claims. (Cl. 260—566)

This invention relates to the preparation of cyclohexanone oxime and more particularly to the preparation of cyclohexanone oxime from an organic nitroso compound, such as, nitrosocyclohexane.

The conversion of cyclohexylamine to cyclohexanone oxime with the use of oxidizing agents is known. The usual oxidizing agents are sulfomonoperoxy acids or hydrogen peroxide. In a recent process, hydrogen peroxide is used in the presence of catalysts. The cyclohexanone oxime resulting from this reaction is obtained in varying yields. The contamination produced by the higher oxidation products varies in amount with the reaction conditions. In order to prepare pure cyclohexanone oxime, these impurities must, therefore, be separated by means of recrystallization or by steam distillation. This results in considerable loss in oxime.

It is possible, in accordance with a recent development, to obviate the disadvantages of the above process by using only half of the quantity of hydrogen peroxide, when cyclohexylamine is reacted with hydrogen peroxide in the presence of catalysts and stabilizers to form cyclohexylhydroxylamine. In another recent development, cyclohexylhydroxylamine is oxidized with air oxygen in the presence of catalysts or oxidizing agents which are cheaper than hydrogen peroxide, e. g., ferric chloride, in acid solution to form bis-nitrosocyclohexane in accordance with the process set forth in our copending application, Serial No. 501,446, filed April 14, 1955.

Because of its good steam diffusion properties, bis-nitrosocyclohexane can be separated from the reaction mixture and obtained in very pure form.

It has now been found that cyclohexanone oxime can be prepared from bis-nitrosocyclohexane by isomerization. This heretofore unknown method of preparation represents a considerable simplification in the usual methods for the manufacture of the commercially important compound, cyclohexanone oxime.

The rearrangement of bis-nitrosocyclohexane to form cyclohexanone oxime can be brought about by means of heat. As an intermediate step, the bimolecular compound changes into a monomolecular one. The monomolecular nitrosocyclohexane is quantitatively converted into cyclohexanone oxime.

The rearrangement takes place at a satisfactory rate in solution at temperatures above 80° C. It can also be effected in the melt, at 118° C. Since the rearrangement reaction is exothermic, the use of inert organic solvents boiling between 80 and 120° C. is advisable because of the better removal of the liberated heat. Suitable solvents include pyridine, ethanol, n-butanol and chloroform. After evaporating the solvent under vacuum, the cyclohexanone oxime is obtained in a high degree of purity. No subsequent purification is necessary for the preparation of ε-aminocaprolactam.

Example I

A saturated solution of bis-nitrosocyclohexane in pyridine is heated in a reflux condenser to the boiling point of pyridine (115.5° C.). The colorless solution obtained turns dark blue-green on heating, and, as a result of the heat of isomerization, the reaction mixture boils without any further application of heat. The decolorization of the solution which occurs after a short time indicates the end of the rearrangement reaction and, consequently, the formation of cyclohexanone oxime. The latter is obtained in pure form (M. P. 89° C.) by distillation of the solvent.

Example II

Bis-nitrosocyclohexane is slowly heated to 118° C. Upon incipient melting, the heat source is removed, because the heat of isomerization is sufficient to melt the bis-nitrosocyclohexane still in crystal form. The deep blue-green color of the melt which first appears soon changes to a light brown. On cooling, cyclohexanone oxime crystallizes and is found to have a melting point of 88° C.

The cyclohexanone oxime of high degree of purity obtained in accordance with this invention is suitable for direct preparation of ε-aminocaprolactam.

What we claim and desire to protect by Letters Patent is:

1. In the process of preparing cyclohexanone oxime in pure form by rearranging pure bis-nitrosocyclohexane obtained by oxidation of cyclohexylhydroxylamine, the improvement which consists in heat-treating the bis-nitrosocyclohexane dissolved in an inert solvent of the group consisting of pyridine, ethanol, n-butanol and chloroform at a temperature of from about 80 to about 120° C. to effect complete rearrangement of said bis-nitrosocyclohexane to cyclohexanone oxime.

2. The process according to claim 1 in which the cyclohexanone oxime is recovered in pure form following distillation of the solvent.

References Cited in the file of this patent
FOREIGN PATENTS 281,124   Switzerland _____ Aug. 8, 1949

OTHER REFERENCES

Aston, et al.: J. A. C. S. Vol. 54, 1530–1538 (1932).
Whitmore: Organic Chemistry, Van Nostrand & Co., New York, 1951, page 165.
Bamberger: Berichte, vol. 44, pages 3066–72.